Aug. 21, 1951 A. SISCO 2,565,049

FISH LURE

Filed Oct. 17, 1945

INVENTOR:—
ALEXANDER SISCO
BY
Charles S. Penfold ATTORNEY

Patented Aug. 21, 1951

2,565,049

UNITED STATES PATENT OFFICE 2,565,049

FISH LURE

Alexander Sisco, Bronson, Mich., assignor to Shurebite Inc., Bronson, Mich., a corporation of Michigan Application October 17, 1945, Serial No. 622,872

1 Claim. (Cl. 43—42.4)

This invention relates to artificial lures or fish baits and more particularly is directed to a lure adapted for casting and trolling.

One primary object of the invention is to provide a lure particularly adapted for use in areas in which weeds, lily pads, and other vegetation abounds, the lure being of a character that after being cast may be reeled in with a life-like action through the pads and reeds without catching thereon.

Another important object of the invention is to provide unique and novel guard means associated with the hook means or lure body whereby the body or hook means, or both are made substantially weedless, the guard being of such a character that it does not create interference when the lure is struck by a fish due to the fact that the guard is rendered substantially inoperative or less effective the more it is moved with respect to the body of the lure.

A further object of the invention is to provide a lure which may be caused to aquaplane over the surface of the water and will function satisfactorily whether it lands in the water top or bottom side up.

An additional object of the invention is to provide a lure comprised of few durable parts which can be economically manufactured and assembled together on a production basis.

Other objects and advantages of the invention will become apparent when considering the description hereinafter set forth in conjunction with the drawing annexed hereto.

In the drawing, wherein the preferred construction is illustrated:

Figure 1:
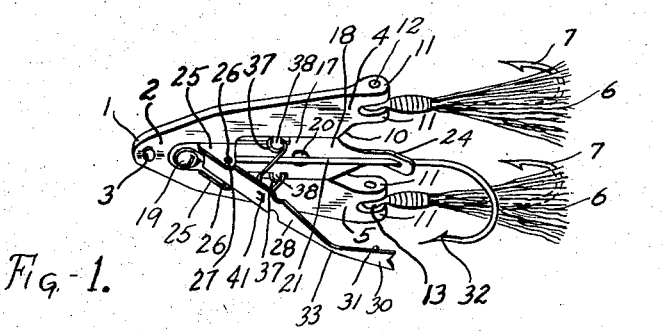
Figure 1 is a pictorial view of the lure embodying the invention, with buck tails shown in an extended substantially horizontal position, the position same are more or less intended to normally assume when the lure is pulled at a relatively fast rate of speed through the water.
Figure 2:
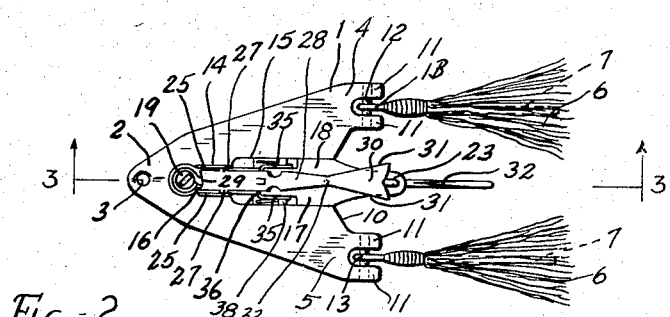
Figure 2 is a top view of the lure depicted in Figure 1.

Referring to the drawings it will be apparent that the body 1 of the lure is generally triangular in shape, the fore extremity 2 being provided with an aperture 3, for the reception of a line or an attachment secured to the line, and the two rearward corresponding spaced apart extremities 4 and 5 preferably carry buck tails 6 or hooks 7, or both depending on the desire of the fisherman.

More specifically, the underside of the body adjacent the fore or front extremity and the sides is preferably inclined at 8 and 9, respectively, whereby to assist in causing the lure to skip, glide, or aquaplane over the surface of the water. The lure due to the inclinations or flarings, is somewhat thicker in cross-section along the medial line or central portion as exemplified in Figure 3. The body may be constructed from any desirable material but is preferably constructed from a pyroxylin plastic or phenolic condensate. It may also be of any suitable weight and color. The lure is of such a character that it may be drawn through the water top or bottom side up, and if it lands upside down it usually rights itself after it travels but a relatively short distance.

The rear or trailing extremities 4 and 5 of the body are of such a character that they provide the body with a bifurcation, the bifurcation being enlarged by a generally V-shaped recession 10. Each of the extremities or extensions 4 and 5 is preferably notched to provide a pair of spaced apart apertured corresponding lugs 11. A pin 12 is suitably secured in the apertures and is received in the eye 13 of the buck tail 6 or hook 7 for pivotally mounting the same for movement in an arc approaching 360 degrees. This factor is important because the tails and/or hooks are free to pivot whether the lure is top or bottom side up, and when the lure is drawn rapidly through the water the tails and/or hooks will tend to assume a substantially horizontal position, but when the speed is decreased the tails and or hooks will tend to swing downwardly, and in either of these or other positions the hooks are properly presented to any fish charging the lure.

The upper surface of the lure body is preferably provided with a pocket formed by a pair of longitudinally extending connected recesses 14 and 15 within which are seated the relatively narrow and relatively wide extremities 16 and 17, respectively, of a mounting member or plate 18, preferably secured in place by a pair of screws 19 and 20 which extend through holes provided therefor in the member and are threaded into tapped holes in the body. A relatively large hook 21 is secured to the member with its loop 22 preferably extending in a direction opposite to that of the hooks 7 and in a trailing position with respect to the rear end of the lure body. The eye of the hook is secured in place by the screw 19 and the shank extends along the upper surface of the plate member and projects through an oblong opening 23 of a size to permit the eye of the hook to pass therethrough when the hook is being assembled to the member. The end portion 24 provided with the opening 23 is preferably inclined or upturned, of a size somewhat smaller than the remainder of the extremity 17, and substantially bisects the angle of the V recession 10 whereby to provide a well balanced assembly.

The extremity 16 of the mounting member 18 is preferably provided with a pair of corresponding generally parallel walls forming standards 25. Each standard is provided with a hole 26 which receives a projection or pintle 27, provided adjacent the longitudinally extending marginal edges of a flexible guard 28 near its front end whereby to connect the guard for pivotal movement with respect to the mounting member and particularly with respect to the loop portion 22 of the hook 21. The extreme front end of the guard 28 is preferably notched at 29 to receive and engage a portion of the hook shank and to limit the upward movement of the guard and position the angled tail-like portion 30 of the guard in the proper position to prevent weeds from catching on the hook. The tail portion 30 is generally triangular in shape and the tapered edges 31 which more or less are disposed on either side of barb 32 cause the weeds, pads, reeds, and other marine vegetation to be diverted along the sides of the hook and upwardly when the lure is travelling through the water.

Figure 3:
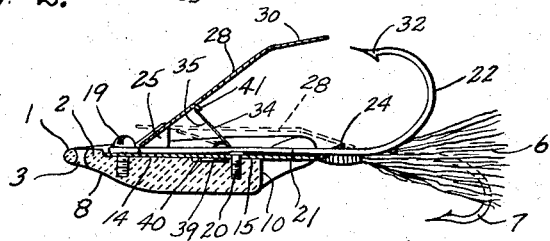
Figure 3 is a longitudinal sectional view taken substantially on line 3—3 of Figure 2, showing certain details of construction.
Figure 4:
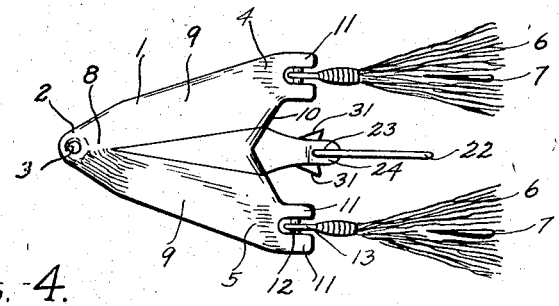
Figure 4 is a bottom view of the lure illustrated in the foregoing figures.

Downward movement of the guard is limited by the tail portion 30 engaging the shank of the hook beyond the end of the portion 24 of the plate member, as illustrated by the dotted lines in Figure 3. The guard more or less simulates, at least a portion of a minnow, and the tail portion is notched so that greater protection is provided for the barb of the hook. The fact that the guard is narrow adjacent its extremities as indicated at 33 also improves the simulating effect.

Figure 5:
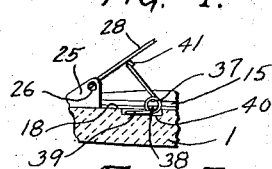
Figure 5 is an appropriate sectional view showing additional details of design and construction.

The guard is normally held in the inclined position illustrated by resilient means, preferably in the form of a wire spring 34. The spring is generally of a bifurcated character and includes corresponding generally parallel leg portions 35 joined by a transverse connecting portion 36. Each leg is provided with a coiled or looped portion 37 which receives a lateral projection 38 formed on the mounting member adjacent the junction between the extremities 16 and 17. The ends 39 of the wire are preferably caught under the projections and seat within depressions 40 formed in the lure body as clearly illustrated in Figure 5. The side walls of the recess 15 prevent the coils or loops 37 from slipping off the projections 38. The transverse connection portion 36 of the spring is adapted to engage the guard and bear against an inturned stop 41 formed on the guard. The spring is so constructed and arranged that it tends to expand and maintain the guard in the inclined position stated but when the guard is pivoted by the strike of a fish the connecting portion 36 will slide down the guard in a direction toward the front end of the lure. As a result of this movement the leverage of the guard is progressively increased to counteract the increased tension of the spring. In other words, the greater the distance that the tail portion 30 of the guard is depressed toward the lure body the more it renders the spring less effective. The arrangement is also of such a character that it is more or less difficult to pivot the guard until a predetermined amount of pressure or force has first been applied to the guard. This provides a safety factor and insures a good weedless condition. The fact that the guard is at least partially flexible also assists in improving this condition.

Having thus described my invention I do not wish to be understood as limiting myself or the scope of the invention, as many changes and modifications may be made therein without departing from the spirit of the invention.

I claim:

A fish lure comprising a body of generally triangular formation having a forward inclined portion to which a line can be connected and a pair of spaced apart rearward corner portions, a hook pivotally connected to each of the corner portions with the barb of each hook being adapted to assume a position below the underside of the body when the lure is pulled through the water, an elongated narrow base plate member secured to the upper side of the body between the said corner portions, said base plate member having integral upstanding walls adjacent its fore extremity and an opening in its rear extremity, a center hook having a shank and an eye overlying the base plate member with the shank extending through the opening and the barb positioned above the body, a screw extending through the eye of the hook and base plate member into the body for securing the hook in place, an elongated guard member pivotally connected at a point intermediate its ends to the upstanding walls of the base plate member, and a spring interposed between the pivotal connection and the rear ends of the guard member and base plate member so that the fore end of the guard member will be caused to engage the hook shank and thereby position the rear end of the guard member adjacent the barb of the center hook, said spring being so constructed and arranged that the point of pressure engagement between the spring and said guard member will move toward the said pivotal connection when the rear end of the guard member is directed toward the barb of the center hook.

ALEXANDER SISCO.

REFERENCES CITED

The following references are of record in the file of this patent:

UNITED STATES PATENTS

| Number | Name | Date |
| --- | --- | --- |
| 378,678 | Harlow | Feb. 28, 1888 |
| 1,583,199 | Taylor | May 4, 1926 |
| 1,709,010 | Foss | Apr. 16, 1929 |
| 1,997,802 | Meyer | Apr. 16, 1935 |
| 2,392,677 | Lauby | Jan. 8, 1946 |